United States Patent
Goodman et al.

(10) Patent No.: US 9,568,633 B2
(45) Date of Patent: Feb. 14, 2017

(54) ELECTROMAGNETIC FORMATION EVALUATION TOOL APPARATUS AND METHOD

(71) Applicant: Halliburton Energy Services, Inc., Houston, TX (US)

(72) Inventors: George David Goodman, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 98 days.

(21) Appl. No.: 14/421,053

(22) PCT Filed: Mar. 21, 2014

(86) PCT No.: PCT/US2014/031446
§ 371 (c)(1),
(2) Date: Feb. 11, 2015

(87) PCT Pub. No.: WO2015/142352
PCT Pub. Date: Sep. 24, 2015

(65) Prior Publication Data
US 2016/0259081 A1 Sep. 8, 2016

(51) Int. Cl.
*G01V 3/20* (2006.01)
*G01V 3/28* (2006.01)

(52) U.S. Cl.
CPC .. *G01V 3/20* (2013.01); *G01V 3/28* (2013.01)

(58) Field of Classification Search
CPC .................................. G01V 3/20; G01V 3/28
(Continued)

(56) References Cited

U.S. PATENT DOCUMENTS 5,796,677 A 8/1998 Kostek et al.
6,478,097 B2 11/2002 Bloom et al.
(Continued)

FOREIGN PATENT DOCUMENTS

WO WO-02086459 A1 10/2002
WO WO-2004113674 A1 12/2004
(Continued)

OTHER PUBLICATIONS

"European Application Serial No. 14841376.8, Office Action mailed Oct. 2, 2015", 2 pgs.
(Continued)

*Primary Examiner* — Reena Aurora
(74) *Attorney, Agent, or Firm* — Gilliam IP PLLC

(57) ABSTRACT

Apparatus and methods are described, such as for obtaining information indicative of a formation resistivity using an electromagnetic formation evaluation tool apparatus. For example, the electromagnetic formation evaluation tool apparatus includes exciter electrodes configured to transmit and receive a formation current. A first exciter electrode may be insulated from a conductive apparatus housing and a second exciter electrode may be coupled to the conductive apparatus housing. Monitor electrodes may be insulated from the conductive apparatus housing. A receiver circuit may be coupled to the monitor electrodes and configured to measure a voltage differential between the monitor electrodes. A power amplifier circuit may be coupled to the first exciter electrode and the conductive apparatus housing and configured to generate the formation current wherein the conductive apparatus housing provides a return path to the power amplifier circuit for the formation current.

21 Claims, 5 Drawing Sheets

(58) Field of Classification Search
USPC .......................................................... 324/355
See application file for complete search history.

(56) References Cited

U.S. PATENT DOCUMENTS

| | | | | |
|---|---|---|---|---|
| 8,085,049 | B2 * | 12/2011 | Bittar ........................ | G01V 3/28 |
| | | | | 324/337 |
| 9,239,402 | B2 * | 1/2016 | Li ............................. | G01V 3/24 |
| 2016/0091627 | A1 | 3/2016 | Donderici et al. | |
| 2016/0139289 | A1 | 5/2016 | Donderici et al. | |

FOREIGN PATENT DOCUMENTS

| | | |
|---|---|---|
| WO | WO-2011/130080 A2 | 10/2011 |
| WO | WO-2015/112136 A1 | 7/2015 |
| WO | WO-2015/142352 A1 | 9/2015 |

OTHER PUBLICATIONS

"European Application Serial No. 14841376.8, Response filed Dec. 8, 2015 to Office Action mailed Oct. 2, 2015", 6 pgs.
"International Application Serial No. PCT/US2014/031446, International Search Report mailed Nov. 26, 2014", 5 pgs.
"International Application Serial No. PCT/US2014/031446, Written Opinion mailed Nov. 26, 2014", 4 pgs.

* cited by examiner

ELECTROMAGNETIC FORMATION EVALUATION TOOL APPARATUS AND METHOD

PRIORITY APPLICATIONS

This application is a U.S. National Stage Filing under 35 U.S.C. 371 from International Application No. PCT/US2014/031446, filed on 21 Mar. 2014, which application is incorporated herein by reference in its entirety.

BACKGROUND

Various techniques may be used to evaluate geological formations. For example, laterolog tools can use current and monitor electrodes to provide resistivity logging for a variety of relatively shallower or relatively deeper radial depths of investigation. In a laterolog tool, focusing of an injected current may be established using hardware or software techniques, or a combination of both hardware and software techniques.

Certain measurement scenarios may still be problematic for laterolog tool measurements. For example, since both the excitation source and the measurement sensors reside within the same tool, direct cross-coupling exciter-to-sensors (e.g., cross-talk) can limit the tool's sensitivity to a desired formation measurement.

DETAILED DESCRIPTION

Apparatus and techniques are described, such as for obtaining geological information indicative of a formation resistivity using an electromagnetic formation evaluation tool apparatus. For example, a magnetic field is generated, from a well tool in a borehole, through a geological formation through which the borehole extends. The magnetic field can be generated by excitation electrodes on the electromagnetic formation evaluation tool apparatus, selected according to a specified excitation mode, and induced voltages are received from the geological formation, resulting from the excitation, using monitor electrodes selected according to the specified excitation mode. The electromagnetic formation evaluation tool apparatus uses a tool enclosure itself (e.g., tool backbone) as a current return for the excitation electrodes in order to place the magnetic field outside of the tool and reduce the cross-talk at the monitor electrodes.

Figure 1:
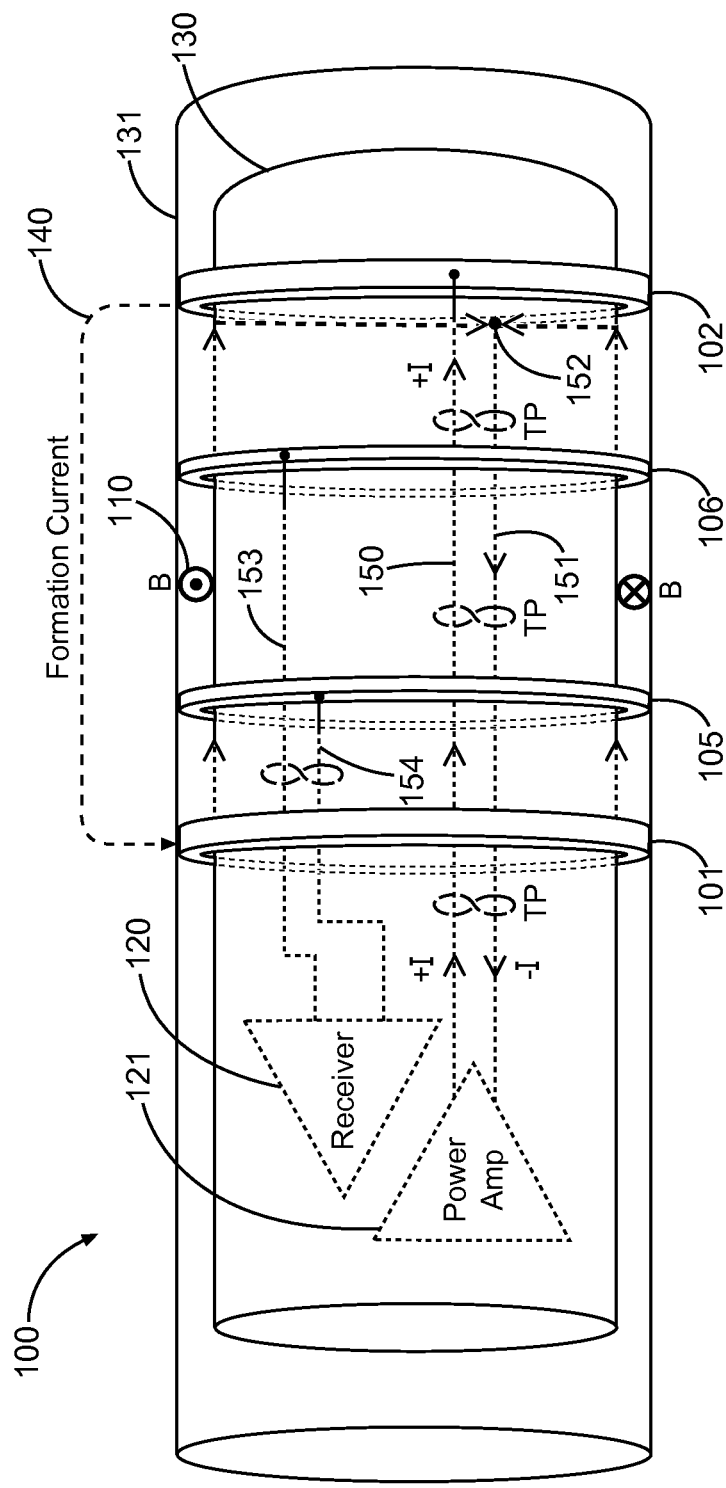
FIG. 1 illustrates an embodiment of an electromagnetic formation evaluation tool apparatus.

FIG. 1 illustrates generally an example of the electromagnetic formation evaluation tool apparatus 100 in mud and geological formation (not drawn). Subsequent illustrations and discussions of the electromagnetic formation evaluation tool apparatus 100 in FIG. 1 and FIG. 2 refer to the electromagnetic tool apparatus 100 as having a cylindrical shape. This is for purposes of illustration only as the present embodiments do not require any certain shape for the apparatus 100. In one or more embodiments, the apparatus 100 can be referred to as a laterolog class of logging tool.

Figure 4:
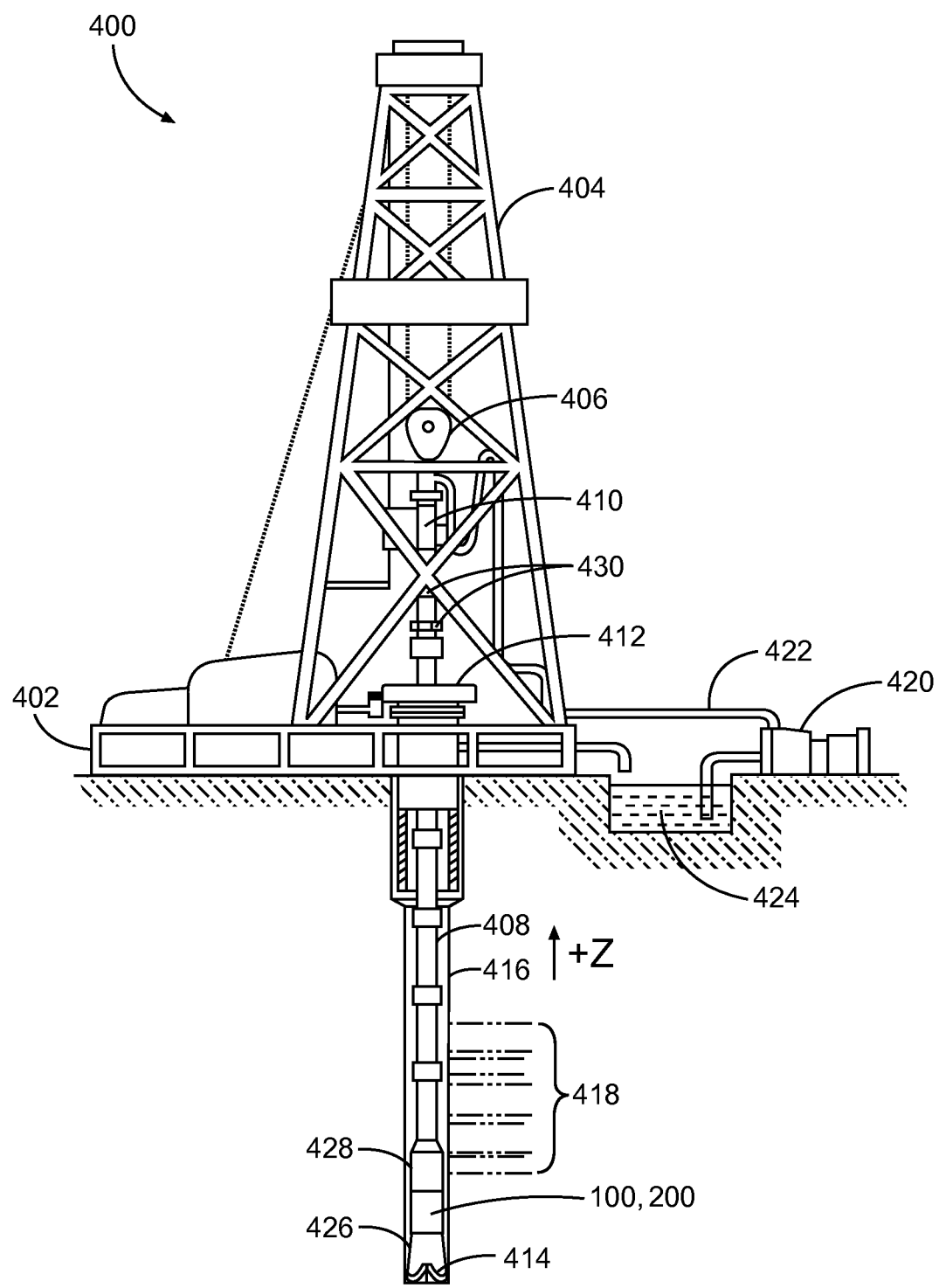
FIG. 4 illustrates an embodiment of a drilling apparatus, such as including a measure-while-drilling (MWD) or log-while-drilling (LWD) capability, in accordance with the embodiments of FIGS. 1 and 2.
Figure 5:
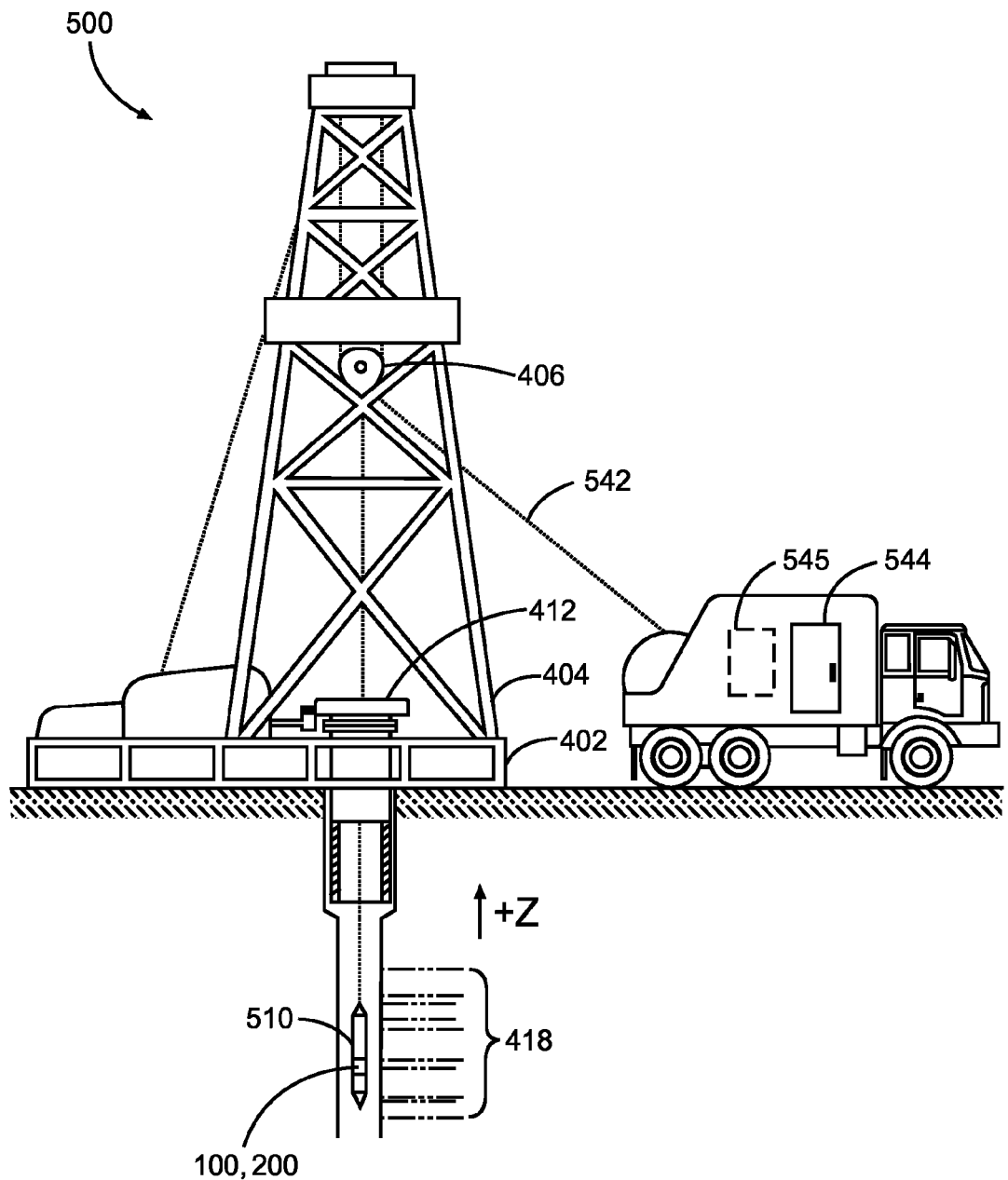
FIG. 5 illustrates an embodiment of a wireline logging apparatus in accordance with the embodiments of FIGS. 1 and 2.

The electromagnetic formation evaluation tool apparatus 100 is shown within a housing 131 (e.g., cylinder). Since the apparatus 100 may be included as a portion of a drill string in a LWD application (e.g., as shown in FIG. 4), or as a portion of a wireline sonde (e.g., as shown in FIG. 5), the housing 131 can include portions of the drill string or wireline sonde. Other configurations may be used, such as including a tubing-conveyed downhole logging configuration.

The electromagnetic tool apparatus 100 includes an apparatus inter-housing 130. The apparatus inter-housing 130 is conductive, as described subsequently, and can include a tool backbone. In one or more embodiments, the conductive apparatus inter-housing 130 includes a cylindrical shape. The conductive housing inter-130 can comprise a wire mesh "squirrel cage".

The electromagnetic tool apparatus 100 also includes a pair of exciter electrodes 101, 102 for generating a formation current 140 through the mud and geological formation in order to obtain information indicative of a geological formation resistivity. The exciter electrodes 101, 102 can include concentric rings around the periphery of the apparatus 100 and can be referenced as a positive exciter electrode 102 and a negative exciter electrode 101.

The positive exciter electrode 102 is insulated from the conductive apparatus inter-housing 130. The negative exciter electrode 101 is coupled to the apparatus inter-housing 130. Other embodiments may reverse this orientation. With such a construction, as discussed subsequently, the received geological formation current 140 can be returned to a power amplifier circuit 121 along the conductive inter-housing 130.

A pair of voltage monitor electrodes 105, 106 is included to receive a voltage resulting from the geological formation experiencing the formation current 140 and magnetic field 110, as described subsequently. The electrodes 105, 106, for measuring a voltage differential between the electrodes, can be referenced as a positive monitor electrode 106 and a negative monitor electrode 105. Both of the voltage monitor electrodes 105, 106 are insulated from the conductive apparatus inter-housing 130.

A receiver circuit 120 (e.g., receiver operational amplifier) includes differential inputs that are each coupled to a different voltage monitor electrode 105, 106. For example, the "+" input of the receiver circuit 120 can be coupled to the positive monitor electrode 106 while the "−" input of the receiver circuit 120 can be coupled to the negative monitor electrode 105. The receiver circuit 120 can then be used to measure the received voltage differential between the two electrodes 105, 106. In one or more embodiments, such a measured voltage differential can be in a range of less than a micro-Volt ($\mu V$).

The wires 153, 154 coupling the receiver circuit 120 to the voltage monitor electrodes 105, 106 can be a twisted pair (e.g., shielded twisted pair) in order to reduce any extraneous electromagnetic interference that can interfere with the measurement activity of the electrodes 105, 106. Other embodiments might use other forms of shielded lines (e.g., coaxial) in order to create a substantially similar benefit. The wires can be homogeneously distributed enough to achieve good balancing that can substantially reduce magnetic fields inside the conductive inter-housing 130.

A power amplifier circuit 121 includes differential outputs that are each coupled to a different exciter electrode 101, 102. The power amplifier circuit 121 can be the source of the formation current 140 transmitted by the positive exciter electrode 102, through the geological formation, for reception by the negative exciter electrode 101 and returned to the power amplifier circuit 121 through the conductive inter-housing 130 and respective wire 151.

The feed-wires 150, 151 coupling the power amplifier circuit 121 to the exciter electrodes 101, 102 can be various shielded types of wires (e.g., twisted-shielded pair, coaxial, twin lead) in order to reduce extraneous electromagnetic interference that can interfere with the measurement activity of the electrodes 101, 102. Other embodiments might use other forms of feed-wires (e.g., twisted-shielded pair, coaxial, twin lead) in order to create a substantially similar benefit. The wires can be advantageously coupled to substantially reduce magnetic fields inside the conductive inter-housing 130.

For purposes of reducing cross-talk in the circuitry 120, 121 and feed-wires 150, 151, 153, 154 of the apparatus 100, the circuitry 120, 121 and feed-wires 150, 151, 153, 154 are located within the apparatus inter-housing 130. In order to connect the feed-wires 150, 153, 154 to their respective electrodes 102, 106, 105 or the feed-wire 150 to the apparatus inter-housing 130 at region 152, the feed-wires 150, 151, 153, 154 can pass through openings in the inter-housing 130.

In operation, the conductive apparatus inter-housing 130 (e.g., backbone) is maintained as a ground reference. The current 140 that flows in the geological formation returns through the conductive apparatus inter-housing 130 back to a region 152 near the positive exciter electrode 102. This can be achieved by terminating the return of the balanced feed-wire 151 underneath, or as near as physically possible to, the positive exciter electrode 102. The transmitter current path 140 is thus from the positive exciter electrode 102, through the geological formation, to the negative exciter electrode 101 onto the inter-housing 130 and returning to the balanced feed-wire 151, near the positive exciter electrode 102, through the termination region 152. The interfering induction field 110 now resides outside the inter-housing 130 in the region between the apparatus inter-housing 130 and the tool housing 131, and into the formation where it acts on its resistivity as a normal part of the intended measurement.

In addition to moving the magnetic flux lines 110 away from the receiver feed-wires 150, 151, 153, 154, the electromagnetic formation evaluation tool apparatus 100 can also move the magnetic fields 110 away from sensitive parts of the electronics, such as transformers and interconnecting conductors. The apparatus 100 can be combined with a magnetic and/or electrostatic shield to further improve the cross-talk rejection performance. For example, the receiver electronics can be placed in a conductive shield, magnetic shield, or a conductive shield material with desirable magnetic properties (e.g., permalloy), along with the wiring, within the apparatus. Electric field cross-talk can also be reduced as part of the disclosed apparatus 100. The thickness and material of the space in between the monitor electrodes 105, 106 and apparatus inter-housing 130 determines any capacitive coupling between them. Since laterolog-type tools can typically operate with 10 kHz to 50 kHz alternating current (AC) excitation, there is typically some finite capacitive coupling occurring. This capacitive coupling can be illustrated using the following equations:

$$R = R_m * L / (r_{borehole} * r_{borehole} - r_{electrode} * r_{electrode}) / \pi \quad (1)$$

$$A = 2\pi r_{electrode} l \quad (2)$$

$$C = \varepsilon A / d \quad (3)$$

$$\omega = 2\pi f \quad (4)$$

$$Z_C = 1/j\omega C \quad (5)$$

$$Z = 1/(1/R + 1/Z_C) \quad (6)$$

where $R_m$ is the mud resistivity, L is the separation between exciter electrodes, $r_{borehole}$ is the radius of borehole, $r_{electrode}$ is the radius of electrode, R is an estimated resistance between monitor electrode pairs, l is a length of the monitor electrode, A is an area of the monitor electrode, d is a separation between the electrode and the conductive housing, C is an approximate capacitance (ignoring the fringing effects) between the apparatus inter-housing 130 and the electrodes, f is the frequency, ω the radial frequency, Z is the total impedance. Here d can be chosen large enough to have a negligible effect on Z.

One interference effect is the inductive effect that can be produced by the formation current 140 that circulates in the formation and in the tool conductors, through the excitation current path. The magnetic field 110 produced by the excitation current following the excitation current path couples to the voltage measurement circuit defined by the measurement path, producing an electromotive force (EMF) in accordance with Faraday's law, that can create a large error voltage at the voltage monitor electrodes 105, 106.

In one approach, this inductive cross-talk effect may be reduced by certain wire configurations such as using the twisted-conductor (e.g., twisted pair configuration) feed-wires 150, 151, 153, 154 or otherwise attempting to reduce a measurement path loop area. However, such inductive crosstalk may not be completely removed using a purely mechanical approach. Such an inductive cross-talk effect induces a signal that can be imaginary-valued (e.g., having a 90 degree phase relationship to the real-valued resistive component of a measured signal), and a magnitude of the imaginary-valued term generally increases as frequency is increased. In some embodiments, a complex-valued model including the inductive effect is represented as, $$V = (R + j\omega L) I \quad (7)$$

where both I and V are complex-valued (e.g., "phasor") quantities, ω represents the radian frequency of the excitation signal, j represents the square root of (−1) (e.g., an imaginary-valued unit), R represents a resistive term including a contribution from a formation resistance, and L represents an inductive term.

According to various embodiments, I represents a complex-valued excitation current, having a known or measured magnitude and phase, and V represents a complex-valued voltage measurement including both magnitude and phase information, the phase determined with respect to the phase of excitation current or determined with respect to some other reference phase. The model of EQN. (7) may be further modified to include an electric field effect or capacitive effect. For example, such a capacitive effect may include portions of an excitation current path passing through dielectric or air-gap interfaces. The capacitive coupling effect generally decreases with frequency and is also imaginary-valued. In some examples, a complex-valued model including both inductive and capacitive effects is represented as, $$V = \left(R + j\omega L + \frac{1}{j\omega C}\right) I \quad (8)$$

where I and V are again complex-valued representations of an excitation current and a measured voltage, respectively, and where a capacitive term, C, is included. The inductive term, jωL, of EQN. (8) may be omitted, to provide a model including only resistive and capacitive effects. However, the inductive crosstalk effect is generally significant and therefore not neglected.

In various embodiments, the tool apparatus 100 (as well as the tool apparatus 200 of FIG. 2) can be combined with quadrature detection to further improve performance. The received voltage signals can be referenced to the transmitter and a relative phase for the voltage may be calculated. The in-phase component of the voltage is mainly the desired signal, while the out-of-phase (quadrature) component is the cross-talk signal. The out-of-phase component can then be filtered out. Another embodiment can measure the cross-talk component at the surface and subtract it out after each measurement downhole.

Figure 2:
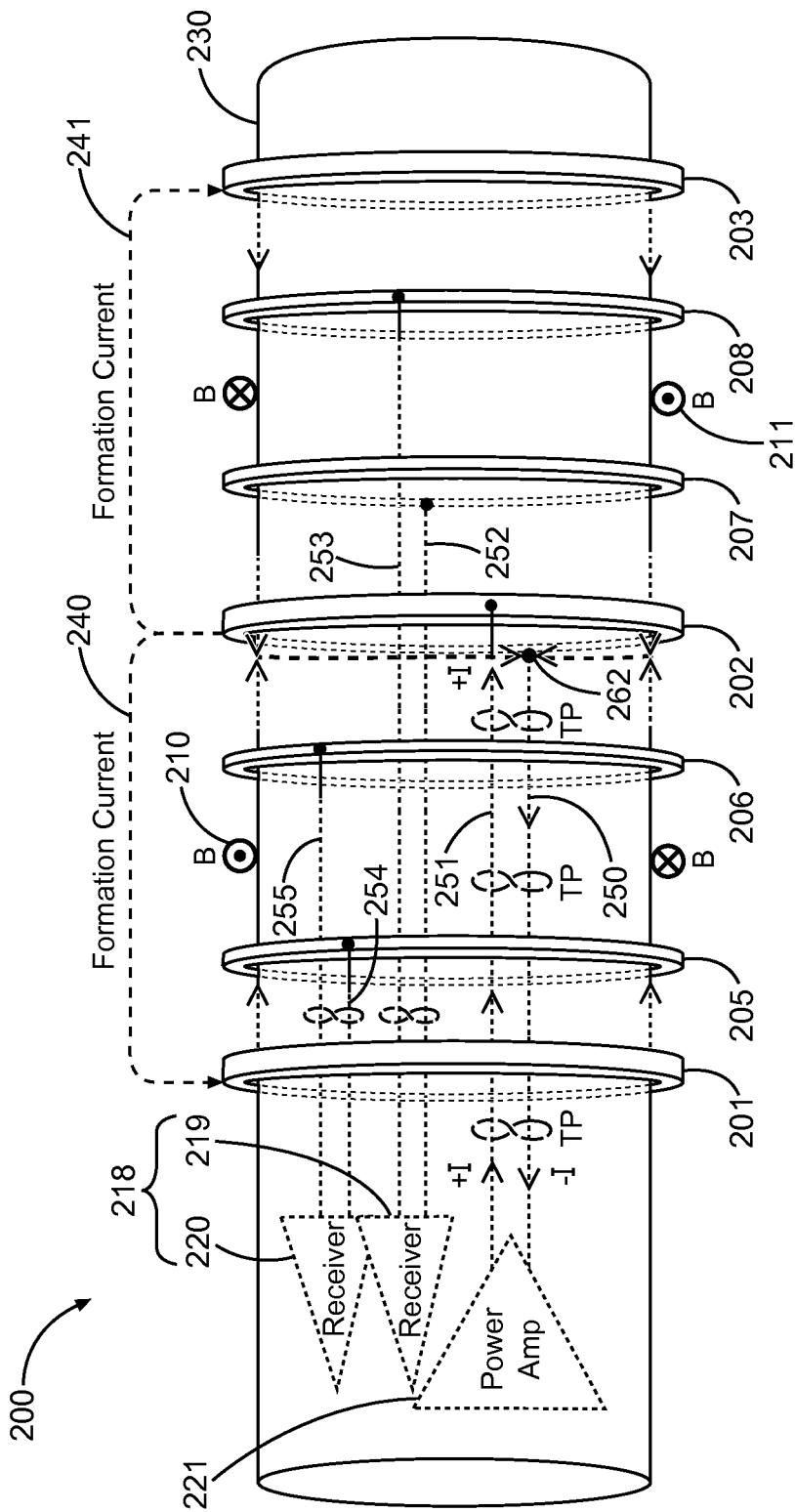
FIG. 2 illustrates an embodiment of an array electromagnetic formation evaluation tool apparatus.

FIG. 2 illustrates an embodiment of an array electromagnetic formation evaluation tool apparatus 200. The embodiment of FIG. 2 uses the concept of the embodiment of FIG. 1 and expands upon it to include multiple exciters and monitors.

Thus, the embodiment of FIG. 2 comprises a plurality of exciter electrodes 201-203 as concentric rings substantially surrounding the conductive apparatus inter-housing 230. In the embodiment of FIG. 2, the plurality of exciter electrodes 201-203 includes one positive exciter electrode 202 with two negative exciter electrodes 201, 203 on either side of the positive electrode 202. Pairs of voltage monitor electrodes 205, 206 and 207, 208 are located between each respective positive/negative pair 202, 201 and 202, 203 of exciter electrodes. The voltage monitor electrodes 205-208 are also concentric rings substantially surrounding the conductive apparatus housing 230.

As in the previous embodiment, the negative exciter electrodes 201, 203 are coupled to the conductive apparatus inter-housing 230 and the positive exciter electrode 202 is coupled to the conductive apparatus housing 230. All of the voltage monitor electrodes 205-208 are insulated from the conductive apparatus inter-housing 230.

A power amplifier circuit 221 is coupled to and drives the positive exciter electrode 202 through feed-wires 250, 251 (e.g., twisted-shielded pair, coaxial, twin lead). One of the feed-wires 251 is coupled to the exciter electrode 202 while the return feed-wire 250 is terminated to the conductive housing 210 under or in a region 262 substantially close to the positive exciter electrode 202.

A receiver circuit 218 includes a plurality of receivers 219, 220. Each receiver 219, 220 is coupled to a respective pair of voltage monitor electrodes 205, 206 and 207, 208. For example, a first receiver 219 is coupled through feed-wires 252, 253 (e.g., twisted-shielded pair, coaxial, twin lead) to the first pair of voltage monitor electrodes 207, 208. A second receiver 220 is coupled through feed-wires 254, 255 (e.g., twisted-shielded pair, coaxial, twin lead) to the second pair of voltage monitor electrodes 205, 206.

In operation, the transmitter current path 240, 241 is thus from the positive exciter electrode 202, through the geological formation, to the negative exciter electrodes 201, 203 onto the conductive apparatus inter-housing 230 and returning to the balanced feed line 250, near the positive exciter electrode 102, through the termination region 262. The interfering induction fields 210, 211 now reside mostly outside the conductive apparatus inter-housing 230 in the region between the apparatus housing 230 and the tool housing and into the formation where it acts on its resistivity as a normal part of the intended measurement.

A laterolog tool, that may be used to form part of the electromagnetic formation evaluation tool apparatus 100, 200 can generally be used to obtain information indicative of a resistivity (or conductivity) of portions of a geological formation at a variety of radial depths extending laterally outward from the tool. Such information from multiple depths may be used to correct for effects related to the presence of borehole and invasion layers, including the determination of an "apparent" or corrected formation resistivity. The information can also be used during a LWD application in order to steer the drill bit.

In an electrical context, use of the phrase "coupled" or "coupling" may refer to either direct coupling, such as conductive electrical coupling (e.g., as in the embodiment of excitation currents conductively coupled into a formation), or indirect coupling (e.g., wireless, reactive, or electromagnetic coupling). In the mechanical context, "coupled" or "coupling" may refer to a direct mechanical connection or an indirect mechanical connection through one or more other mechanical portions of an embodiment.

Figure 3:
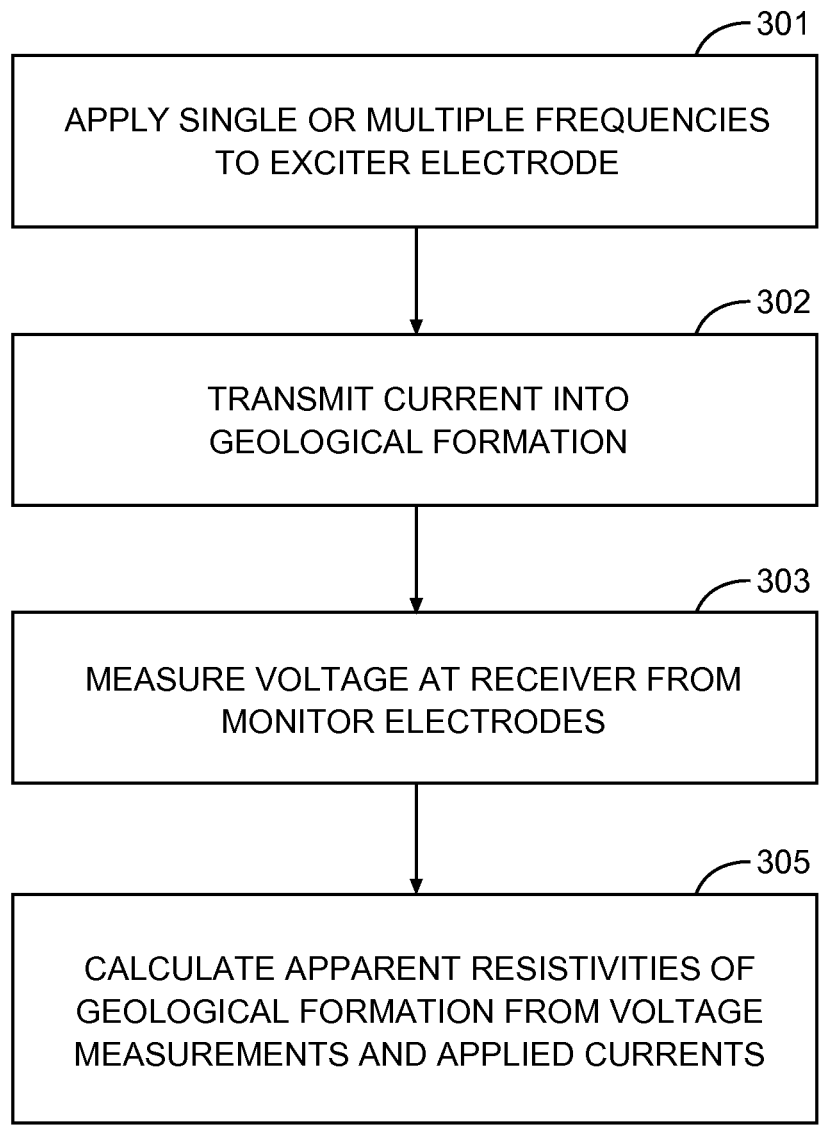
FIG. 3 illustrates a flowchart of an embodiment of a method for determining geologic formation properties in accordance with the embodiments of FIGS. 1 and 2.

FIG. 3 illustrates a flowchart of an embodiment of a method for determining geologic formation properties in accordance with the embodiments of FIGS. 1 and 2. A voltage signal is applied to the exciter electrodes 301. This signal can include one or more frequencies. The power amplifier circuits of the above embodiments can provide a relatively high current (e.g., >1 Amp) to the exciter electrodes. The positive electrode transmits the formation current through the geological formation 302 to be received by the negative exciter electrode(s) and returned to the power amplifier circuit along the conductive apparatus housing.

The current flow in the formation produces a net voltage drop with an electric field distribution that is sensed by the voltage monitor electrodes 303. The apparent resistivities of the geological formation can then be calculated from the voltage measurements and applied currents 305. Different combinations of excitation currents may be used to physically, or through software emulation, generate a focusing effect that reduces the current coupling through the typically conductive mud. This process is referred to in the art as software or hardware focusing, based on how it is implemented. The methods described below operate with any type of focusing methodology.

FIG. 4 illustrates generally an embodiment of a drilling apparatus 400, such as including a MWD or LWD capability. The illustrative example of FIG. 4 can include the electromagnetic formation evaluation tool apparatus 100, 200 such as shown in FIG. 1 or 2 and/or may be used with the technique discussed in relation to FIG. 3.

A drilling rig or platform 402 generally includes a derrick 404 or other supporting structure, such as including or coupled to a hoist 406. The hoist 406 may be used for raising or lowering equipment or other apparatus such as drill string 408. The drill string 408 may access a borehole 416, such as through a well head 412. The lower end of the drill string 408 may include various apparatus, such as a drill bit 414, such as to provide the borehole 416.

A drilling fluid or "mud" may be circulated in the annular region around the drill bit 414 or elsewhere, such as provided to the borehole 416 through a supply pipe 422, circulated by a pump 420, and returning to the surface to be captured in a retention pit 624 or sump. Various subs or tool assemblies may be located along the drill string 408, such as include a bottom hole assembly (BHA) 426 or a second sub 428.

As the BHA 426 or second sub 428 pass through various regions of a formation 418, information may be obtained. For example, the BHA 426, or the second sub 428, may include apparatus such as shown in the embodiments of FIG. 1 or 2, such as to obtain array laterolog measurements for use in determining an apparent formation 418 resistivity. This information may be used to control the direction of the drill bit 414. The second sub 428 may include wireless telemetry or logging capabilities, or both, such as to transmit or later provide the information indicative of the formation resistivity to operators on the surface or for later access in evaluation of formation 418 properties. For example, portions 430 of the apparatus 400 at the surface may include one or more of wireless telemetry, processor circuitry, or memory facilities, such as to support LWD or MWD operations.

FIG. 5 illustrates generally an example of a wireline logging apparatus. The illustrative example of FIG. 5 may include the electromagnetic formation evaluation tool apparatus 100, 200 such as shown in FIGS. 1 through 2 and/or may be used with techniques discussed in relation to FIG. 3. Similar to the example of FIG. 4, a hoist 406 may be included as a portion of a platform 402, such as coupled to a derrick 404, and used to raise or lower equipment such as a wireline sonde 510 into or out of a borehole. In this wireline example, a cable 542 may provide a communicative coupling between a logging facility 544 (e.g., including a processor circuit 545 or other storage or control circuitry) and the sonde 510. In this manner, information about the formation 418 may be obtained, such as using a laterolog tool included as at least a portion of the sonde 510 as discussed in other examples herein (e.g., a laterolog tool including apparatus 100 as in FIG. 1 or apparatus 200 as in FIG. 2).

For purposes of illustration, the examples of FIGS. 4 and 5 show a vertically-oriented borehole configuration. However, the apparatus and techniques described herein may also be used in other borehole configurations, such as a borehole including a horizontal penetration direction, or an oblique borehole configuration, for example. The examples of FIGS. 4 and 5 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments

Embodiment 1 is an electromagnetic formation evaluation tool apparatus comprising: a plurality of exciter electrodes configured to transmit and receive formation currents, the plurality of exciter electrodes comprising: a first exciter electrode insulated from a conductive apparatus housing that is insulated from a borehole environment; and a second exciter electrode coupled to the conductive apparatus housing; a plurality of monitor electrodes insulated from the conductive apparatus housing; a receiver circuit coupled to the plurality of monitor electrodes and configured to measure a voltage differential between the plurality of monitor electrodes; and a power amplifier circuit coupled to the first exciter electrode and the conductive apparatus housing and configured to generate the formation current, wherein the conductive apparatus housing provides a return path to the power amplifier circuit for the formation current.

The subject matter of embodiment 2 includes the electromagnetic formation evaluation tool apparatus of embodiment 1, wherein the plurality of exciter electrodes comprise a positive exciter electrode configured to transmit the formation current into a geological formation and a negative exciter electrode configured to receive the formation current from the geological formation.

The subject matter of embodiment 3 includes the electromagnetic formation evaluation tool apparatus of embodiments 1-2, wherein the conductive apparatus housing comprises a backbone for the electromagnetic formation evaluation tool apparatus.

The subject matter of embodiment 4 includes the electromagnetic formation evaluation tool apparatus of embodiments 1-3, wherein the power amplifier circuit is coupled to the conductive apparatus under the first exciter electrode.

The subject matter of embodiment 5 includes the electromagnetic formation evaluation tool apparatus of embodiments 1-4, wherein the receiver circuit comprises an operational amplifier with a positive input coupled to a first monitor electrode and a negative input coupled to a second monitor electrode.

The subject matter of embodiment 6 includes the electromagnetic formation evaluation tool apparatus of embodiments 1-5, further comprising a drill string housing substantially surrounding the electromagnetic formation evaluation tool apparatus.

The subject matter of embodiment 7 includes the electromagnetic formation evaluation tool apparatus of embodiments 1-6, further comprising a wireline sonde housing substantially surrounding the electromagnetic formation evaluation tool apparatus.

The subject matter of embodiment 8 includes the electromagnetic formation evaluation tool apparatus of claims 1-7, wherein the receiver circuit is coupled to the plurality of monitor electrodes through shielded wire and the power amplifier circuit is coupled to the first exciter electrode and the conductive apparatus housing through shielded wire.

Embodiment 9 is an electromagnetic formation evaluation tool apparatus comprising: a conductive housing; a plurality of exciter electrodes, each electrode located around the periphery of the conductive housing, the plurality of exciter electrodes including a positive exciter electrode configured to transmit a formation current into a geological formation and a plurality of negative exciter electrodes configured to receive the formation current from the geological formation; a plurality of monitor electrodes, each electrode located around the periphery of the conductive housing, pairs of the monitor electrodes located between each pair of positive and negative exciter electrodes, the plurality of monitor electrodes insulated from the conductive apparatus housing; a receiver circuit coupled to each pair of monitor electrodes and configured to measure a voltage differential between each pair of monitor electrodes; and a power amplifier circuit coupled to the positive exciter electrode and to the conductive apparatus housing in a region of the positive exciter electrode, the power amplifier circuit configured to generate the formation current such that the formation current returns to the power amplifier circuit through the conductive apparatus housing.

The subject matter of embodiment 10 includes the electromagnetic formation evaluation tool apparatus of embodiment 9, wherein the receiver circuit is coupled to each pair of monitor electrodes through a first twisted wire pair and the power amplifier circuit is coupled to the positive exciter electrode and to the conductive apparatus housing through a second twisted wire pair.

The subject matter of embodiment 11 includes the electromagnetic formation evaluation tool apparatus of embodiments 9-10, wherein a transmitter current path with the power amplifier circuit comprises the positive exciter electrode, through the geological formation to the negative exciter electrode onto the conductive housing and returning to the power amplifier circuit through a wire of the second twisted wire pair through a termination region of the conductive housing.

The subject matter of embodiment 12 includes the electromagnetic formation evaluation tool apparatus of embodiments 9-11, wherein the conductive housing comprises a cylindrical housing and the plurality of exciter electrodes and the plurality of monitor electrodes are each ring shaped electrodes substantially surrounding the cylindrical housing.

The subject matter of embodiment 13 includes the electromagnetic formation evaluation tool apparatus of embodiments 9-12, wherein the receiver circuit comprises a plurality of receiver amplifiers, each receiver amplifier coupled to a different pair of the monitor electrodes.

The subject matter of embodiment 14 includes the electromagnetic formation evaluation tool apparatus of embodiments 9-13, wherein the power amplifier circuit and the receiver circuit and their interconnections are electrostatically and/or magnetically shielded.

Embodiment 15 is a method for determining geologic formation properties, the method comprising: applying a voltage signal to an exciter electrode; transmitting a formation current through the geological formation; generating a magnetic field outside of a conductive housing of a formation tool apparatus in response to using the conductive housing as a return path for the formation current; measuring a voltage differential based on the formation current and the magnetic field; and calculating apparent resistivity of the geological formation based on the voltage differential.

The subject matter of embodiment 16 includes the method of embodiment 15, further comprising steering a drill bit of a drill string in response to the apparent resistivities.

The subject matter of embodiment 17 includes the method of embodiments 15-16, further comprising performing the method in a wireline sonde.

The subject matter of embodiment 18 includes the method of embodiments 15-17, further comprising: performing quadrature detection of the magnetic field to detect an in-phase component and an out-of-phase component; and filtering out the out-of-phase component.

The subject matter of embodiment 19 includes the method of embodiments 15-18, wherein the in-phase component and out-of-phase component are referenced to the voltage signal.

The subject matter of embodiment 20 includes the method of embodiments 15-19, wherein applying the voltage signal comprises applying a plurality of frequencies to the exciter electrode as a positive exciter electrode.

The subject matter of embodiment 21 includes the method of embodiments 15-20, and further comprising: measuring a cross-talk component at a surface of the geological formation; and subtracting the measured cross-talk component from the magnetic field.

This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An electromagnetic formation evaluation tool apparatus comprising:
    a plurality of exciter electrodes configured to transmit and receive formation currents, the plurality of exciter electrodes comprising:
        a first exciter electrode insulated from a conductive apparatus housing that is insulated from a borehole environment; and
        a second exciter electrode coupled to the conductive apparatus housing;
    a plurality of monitor electrodes insulated from the conductive apparatus housing, the plurality of monitor electrodes located around the periphery of the conductive housing and between the first and second exciter electrodes;
    a receiver circuit coupled to the plurality of monitor electrodes and configured to measure a voltage differential between the plurality of monitor electrodes; and
    a power amplifier circuit coupled to the first exciter electrode and the conductive apparatus housing and configured to generate the formation current, wherein the conductive apparatus housing provides a return path to the power amplifier circuit for the formation current.

2. The electromagnetic formation evaluation tool apparatus of claim 1, wherein the plurality of exciter electrodes comprise a positive exciter electrode configured to transmit the formation current into a geological formation and a negative exciter electrode configured to receive the formation current from the geological formation.

3. The electromagnetic formation evaluation tool apparatus of claim 1, wherein the conductive apparatus housing comprises a backbone for the electromagnetic formation evaluation tool apparatus.

4. The electromagnetic formation evaluation tool apparatus of claim 1, wherein the power amplifier circuit is coupled to the conductive apparatus under the first exciter electrode.

5. The electromagnetic formation evaluation tool apparatus of claim 1, wherein the receiver circuit comprises an operational amplifier with a positive input coupled to a first monitor electrode and a negative input coupled to a second monitor electrode.

6. The electromagnetic formation evaluation tool apparatus of claim 1, further comprising a drill string housing substantially surrounding the electromagnetic formation evaluation tool apparatus.

7. The electromagnetic formation evaluation tool apparatus of claim 1, further comprising a wireline sonde housing substantially surrounding the electromagnetic formation evaluation tool apparatus.

8. The electromagnetic formation evaluation tool apparatus of claim 1, wherein the receiver circuit is coupled to the plurality of monitor electrodes through shielded wire and the power amplifier circuit is coupled to the first exciter electrode and the conductive apparatus housing through shielded wire.

9. An electromagnetic formation evaluation tool apparatus comprising:
   a conductive housing;
   a plurality of exciter electrodes, each electrode located around the periphery of the conductive housing, the plurality of exciter electrodes including a positive exciter electrode configured to transmit a formation current into a geological formation and a plurality of negative exciter electrodes configured to receive the formation current from the geological formation;
   a plurality of monitor electrodes, each electrode located around the periphery of the conductive housing, pairs of the monitor electrodes located between each pair of positive and negative exciter electrodes, the plurality of monitor electrodes insulated from the conductive apparatus housing;
   a receiver circuit coupled to each pair of monitor electrodes and configured to measure a voltage differential between each pair of monitor electrodes; and
   a power amplifier circuit coupled to the positive exciter electrode and to the conductive apparatus housing in a region of the positive exciter electrode, the power amplifier circuit configured to generate the formation current such that the formation current returns to the power amplifier circuit through the conductive apparatus housing.

10. The electromagnetic formation evaluation tool apparatus of claim 9, wherein the receiver circuit is coupled to each pair of monitor electrodes through a first twisted wire pair and the power amplifier circuit is coupled to the positive exciter electrode and to the conductive apparatus housing through a second twisted wire pair.

11. The electromagnetic formation evaluation tool apparatus of claim 9, wherein a transmitter current path with the power amplifier circuit comprises the positive exciter electrode, through the geological formation to the negative exciter electrode onto the conductive housing and returning to the power amplifier circuit through a wire of the second twisted wire pair through a termination region of the conductive housing.

12. The electromagnetic formation evaluation tool apparatus of claim 9, wherein the conductive housing comprises a cylindrical housing and the plurality of exciter electrodes and the plurality of monitor electrodes are each ring shaped electrodes substantially surrounding the cylindrical housing.

13. The electromagnetic formation evaluation tool apparatus of claim 9, wherein the receiver circuit comprises a plurality of receiver amplifiers, each receiver amplifier coupled to a different pair of the monitor electrodes.

14. The electromagnetic formation evaluation tool apparatus of claim 9, wherein the power amplifier circuit and the receiver circuit and their interconnections are electrostatically and/or magnetically shielded.

15. A method for determining geologic formation properties, the method comprising:
   applying a voltage signal to an exciter electrode;
   transmitting a formation current through the geological formation;
   generating a magnetic field outside of a conductive housing of a formation tool apparatus in response to using the conductive housing as a return path for the formation current;
   measuring a voltage differential based on the formation current and the magnetic field; and
   calculating apparent resistivity of the geological formation based on the voltage differential.

16. The method of claim 15, further comprising steering a drill bit of a drill string in response to the apparent resistivities.

17. The method of claim 15, further comprising performing the method in a wireline sonde.

18. The method of claim 15, further comprising:
   performing quadrature detection of the magnetic field to detect an in-phase component and an out-of-phase component; and
   filtering out the out-of-phase component.

19. The method of claim 18, wherein the in-phase component and out-of-phase component are referenced to the voltage signal.

20. The method of claim 15, wherein applying the voltage signal comprises applying a plurality of frequencies to the exciter electrode as a positive exciter electrode.

21. The method of claim 15, and further comprising:
   measuring a cross-talk component at a surface of the geological formation; and
   subtracting the measured cross-talk component from the magnetic field.

* * * * *